Sept. 14, 1965     G. M. INGLIS     3,206,758
AUTOMATICALLY RESETTING FOOTAGE DIAL
Filed Jan. 15, 1962     2 Sheets-Sheet 1

George M.Inglis
INVENTOR.

BY R. Frank Smith
Robert W Hampton
ATTORNEYS

Sept. 14, 1965   G. M. INGLIS   3,206,758
AUTOMATICALLY RESETTING FOOTAGE DIAL
Filed Jan. 15, 1962   2 Sheets-Sheet 2

George M. Inglis
INVENTOR.

BY R. Frank Smith
Robert W. Hampton
ATTORNEYS

# United States Patent Office 3,206,758
Patented Sept. 14, 1965

3,206,758
AUTOMATICALLY RESETTING FOOTAGE DIAL
George M. Inglis, Rochester, N.Y., assignor to Eastman Kodak Company, Rochester, N.Y., a corporation of New Jersey
Filed Jan. 15, 1962, Ser. No. 166,131
6 Claims. (Cl. 352—172)

This invention involves an automatically resetting footage indicator dial, and more particularly, a pawl and ratchet driven footage indicator dial which automatically returns to an initial position upon opening of the camera cover.

One of the objects of this invention is to automatically reset a footage indicator dial having a pawl and ratchet drive.

An additional object of this invention is to automatically reset a footage indicator dial for a camera adapted to receive reversible film magazines.

A further object of this invention is to accomplish automatic resetting of a footage indicator dial by means of simple and reliable apparatus which is economical to manufacture.

Another object of this invention is to prevent an automatically resetting footage indicator dial from advancing beyond a final indicating position.

An additional object of this invention is to drive an automatically resetting footage indicator dial by apparatus operating on the slip side of a clutch between a camera motor and a camera take-up mechanism, so that a malfunction of the take-up drive is manifested by failure of the footage indicator dial to advance.

In general, this invention comprises a pawl-and-ratchet driven footage indicator dial which is spring urged toward an initial position. A resetting means arranged to be actuated by the opening of the camera cover engages a driving pawl and a locking pawl and displaces them from their positions of engagement with their associated ratchets, thus allowing the footage dial to be returned to its initial position.

The invention will be better understood by reference to the drawings wherein.

Figure 1:
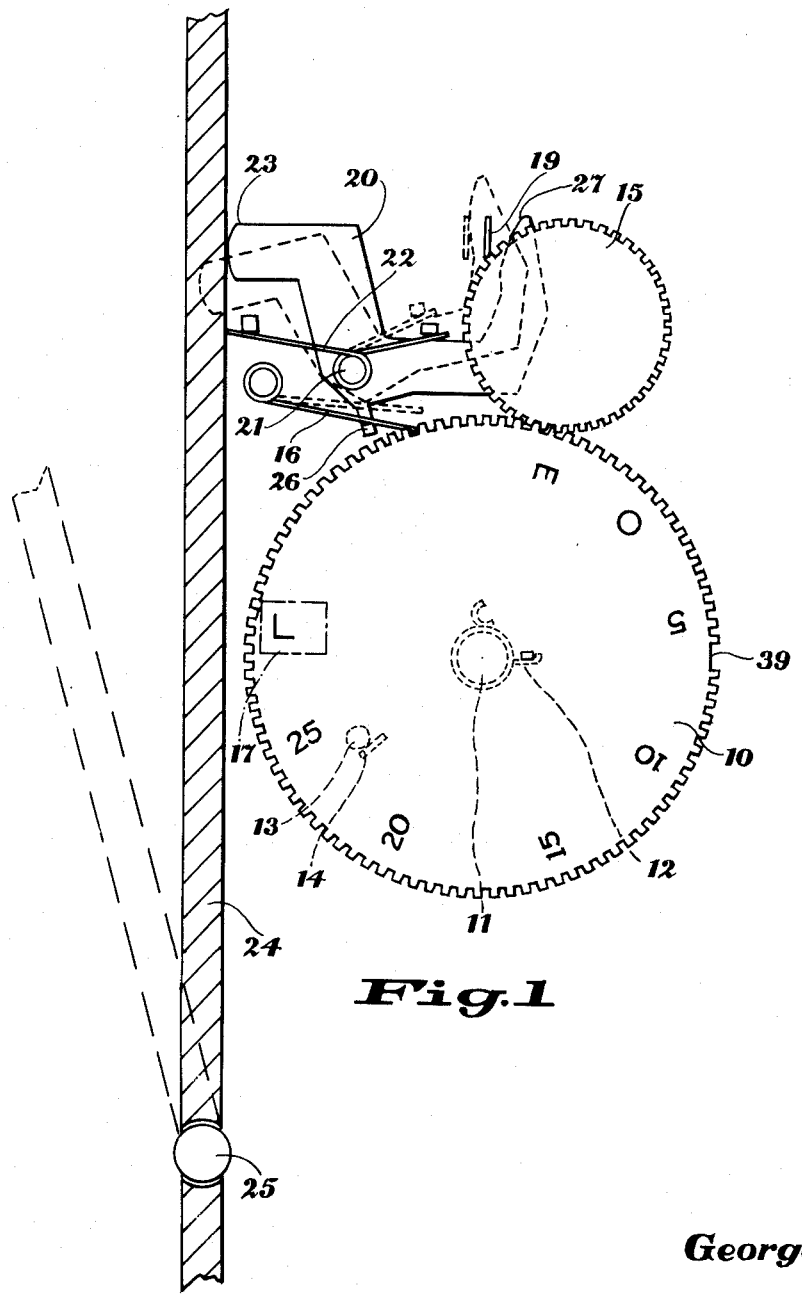
FIG. 1 is a front view of a footage dial and associated resetting means.
Figure 2:
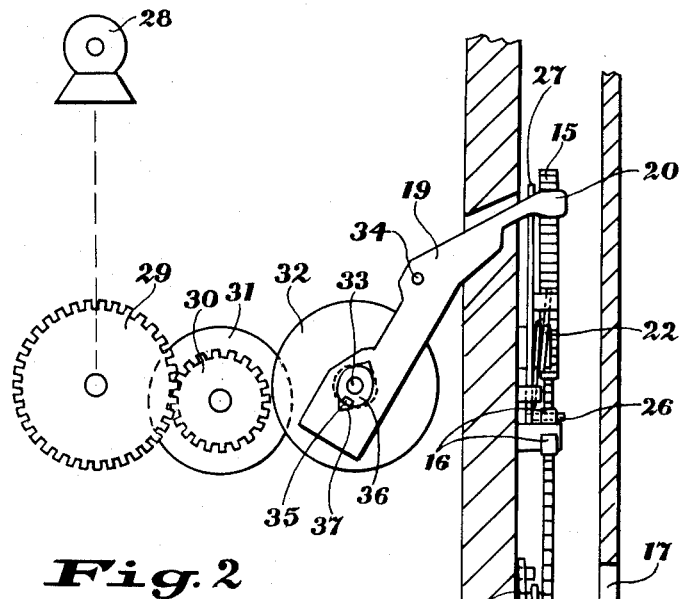
FIG. 2 is a left side view of a footage dial and resetting means showing the drive mechanism for the driving pawl.

Referring to the drawings, and particularly to FIGS. 1 and 2, a footage indicator dial 10 bearing indicia for identifying film footages, for example, the numbers "25," "20," "15," etc., is rotatably mounted on an axis 11, and a spring 12 is arranged to urge the indicator dial 10 toward an initial position, which is the position illustrated in FIG. 1. This initial position is fixed by the abutment of a projection 13 on the indicator dial 10 with a stop 14 on the camera casing 18.

The periphery of indicator dial 10 is provided with gear teeth which mesh with gear teeth on a drive gear 15. The gear teeth on the indicator dial 10 act as a ratchet which is engaged by a resilient fixed or locking pawl 16. A dial viewing window 17, which is an aperture in the camera's outer casing wall 18, allows the camera operator to view the indicia numbers on the indicator dial.

The indicator illustrated in FIG. 1 bears footage indicia numbers from "25" to "0" but it is obvious that any appropriate range of numbers may be selected according to the length of film used in the camera.

The indicator dial 10 is advanced from its initial position through a series of indicating positions by a pawl and ratchet drive system. A reciprocating driving pawl 19 engages the gear teeth of drive gear 15 which serves as a ratchet for driving pawl 19 and also as a drive gear in mesh with the gear teeth of indicator dial 10. The reciprocal motion of driving pawl 19 at the point of engagement with gear 15 is substantially vertical and is such that on a downward stroke, driving pawl 19 advances the drive gear 15 and the indicator dial 10 one tooth. The locking pawl 16, which is a resilient member positioned to catch the gear teeth of the indicator dial 10, holds both the indicator dial 10 and the drive gear 15 in the advanced position and prevents retrograde motion of either while the driving pawl 19 moves vertically upward to engage the next successive tooth of drive gear 15 preparatory to advancement of drive gear 15 and footage dial 10 by one tooth on the next downward stroke of driving pawl 19.

As is obvious to one skilled in the art, locking pawl 16 could be arranged to engage the teeth of drive gear 15, or driving pawl 19 and locking pawl 16 could each be arranged to engage the teeth of indicator dial 10. Thus the driving pawl 19 and the locking pawl 16 could share a common ratchet, or could operate upon separate, operatively interconnected, respective ratchets as illustrated in FIG. 1.

The reset lever 20 is pivotally mounted about the axis 21. A spring 22 urges the reset lever 20 in a counterclockwise rotational direction as illustrated in FIG. 1. A finger 23 of the reset lever 20 engages a camera cover 24 which is mounted upon a hinge 25, and by this engagement the cover 24 holds reset lever 20 out of contact with locking pawl 16 and driving pawl 19 and prevents spring 22 from rotating reset lever 20. An ear 26 and a finger 27, each formed on the surface of reset lever 20, are arranged to contact locking pawl 16 and driving pawl 19, respectively, as the reset lever 20 is pivoted in a counterclockwise direction from its solid-line position toward its broken-line position as illustrated in FIG. 1.

When the camera cover 24 swings open toward its broken line position as shown in FIG. 1, it allows the following events to occur: the reset lever 20 is released from the position in which it was held by the cover 24 when the latter was closed, and the reset lever 20 pivots toward its broken line position: the ear 26 contacts and lifts resilient locking pawl 16 to its broken line position: finger 27 contacts and displaces driving pawl 19 to its broken line position: and indicator dial 10, which is released from the holding engagements of the pawls, rotates counterclockwise to its initial position under the force of spring 12.

Figure 3:
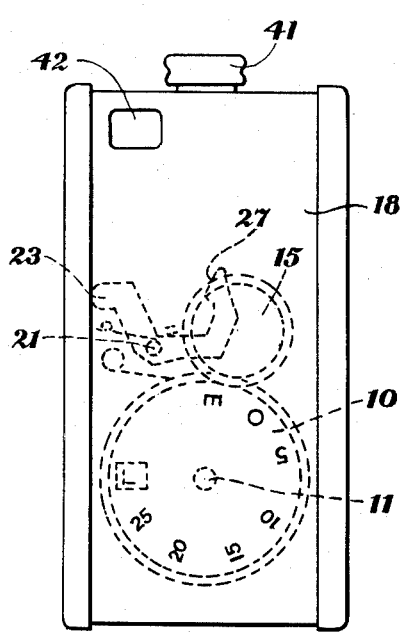
FIG. 3 is a rear view of a camera showing a footage dial and associated resetting means.

FIG. 3 shows the rear of a camera having a casing 18, a carrying handle 41, and a viewfinder 42. The camera's relationship to the footage indicator dial 10, drive gear 15, and reset lever 20 are illustrated.

The driving apparatus for actuating the driving pawl is illustrated in FIG. 2. A camera motor 28 which may be an electric motor, spring motor, or other camera drive, drives gear 29 which meshes with and drives gear 30. Co-axially mounted with gear 30 is a disk 31 frictionally engaging a disk 32 co-axially mounted on a camera take-up drive shaft 33. Disks 31 and 32 form a clutch which slips whenever the take-up drive shaft 33 is overloaded.

The driving pawl 19 is pivotally mounted about an axis 34 and is driven in a pivotally reciprocating motion by an ear or cam 35 of drive member 36 which is co-axially fastened to the camera take-up shaft 33 which rotates whenever film is advanced through the camera. The rotating cam 35 gives this pivotally reciprocating motion to drive pawl 19 by engaging the periphery of a football-shaped aperture 37 in driving pawl 19. The motion of driving pawl 19 at the point of engagement with the ratchet teeth of drive gear 15 is substantially a vertical reciprocating motion.

Since driving pawl 19 is on the slip side of the clutch formed by disks 31 and 32 a camera malfunction causing this clutch to slip, and thus preventing the camera take-up drive from advancing, is manifested by failure of indicator dial 10 to advance. Thus, upon failure of the film to advance through the camera because of a film take-up malfunction, indicator dial 10 responds by failing to advance through its series of indicating positions, so that the indicator dial 10 does not erroneously indicate decreased film footages after the camera drive motor has been operated without actually advancing the take-up drive.

The footage indicator dial which is the subject of this invention may be adapted for use with magazine or non-magazine cameras, since automatic resetting is a valuable feature in either type of camera. However, the subject footage dial is particularly adaptable to cameras employing reversible magazines. "Reversible" in the sense intended here means magazines adapted for operative insertion in a camera in first and second-side orientations.

Referring to FIG. 1, indicator dial 10 has a peripheral irregularity 39 in the form of a missing tooth so located that when the indicator dial 10 is in a final indicating position in which position the symbol "E" appears in the dial viewing window 17, the missing tooth 39 registers with locking pawl 16 and prevents further advancement of indicator dial 10 beyond this point. When the missing tooth 39 registers with locking pawl 16, locking pawl 16 does not have available to it a ratchet tooth to engage for holding the indicator dial 10 in an indicating position on ratchet tooth advanced beyond this point, and the indicator dial 10 and the drive gear 15 merely oscillate with the driving motion of driving pawl 19 without being able to complete an advancement step. This oscillation informs the camera operator that the final indicating position has been reached, and in this position the symbol "E" appears in the dial viewing window 17 signifying that all the film has been run through the camera and that the camera is empty so that the film spool or magazine is ready to be unloaded.

In addition, the missing tooth 39, which prevents advancement of the indicator dial 10 beyond its final indicating position, prevents damaging of the footage dial or footage dial drive mechanism from excessive advancement of indicator dial 10.

*Operation of indicator*

When the camera is first loaded, the indicator dial 10 rests in its initial position as illustrated in FIG. 1 with the symbol "L" appearing in the indicator viewing window 17 as an indication that this position is the load position. As the camera cover 24 is closed, it engages the finger 23 of reset lever 20 and pivots the reset lever 20 against the force of spring 22 in a clockwise direction to the solid-line position illustrated in FIG. 1. In this position the reset lever 20 is held out of contact with the driving pawl 19 and the locking pawl 16, and these pawls are free to engage their respective ratchets. As the film is run through the camera, the driving and locking pawls work in cooperation to advance the indicator dial in step-by-step clockwise rotation a tooth at a time.

The advancement of the indicator dial from the "L" position to the "25" position corresponds with a run of leader film through the camera, and the advanced indicating positions of the indicator dial 10 beyond the "25" position through decreasing numbers to the "0" position indicated the unexposed film footage remaining on the spool of film in the camera. When the exposable film is exhausted, the indicator shows a "0" in the indicator viewing window. The indicia increment from the "0" position to the "E," or final indicating position is to allow for the running of a trailer filmstrip through the camera. For cameras employing reversible magazines, only a portion of this trailer filmstrip is run through the camera after the first film run so as to ensure that a few turns remain coiled on the nearly empty spool in the magazine, because these turns will be needed to hold the film to the spool when the magazine is reversed and this spool becomes the take-up spool.

When the indicator is in the final indicating position and the "E" appears in the indicator viewing window, peripheral irregularity 39 registers with the locking pawl 16, and the indicator dial 10 cannot advance beyond this position, but oscillates slightly, thus informing the camera operator that the final indicating position has been reached and all the film has been run through the camera. At this point, the camera operator may unload the camera. To perform this act, or to reverse a magazine for a second run of film, the camera operator must open the camera cover 24. Opening of the cover 24 releases the reset lever 20 from its held position and allows it to pivot in a counterclockwise direction and contact and disengage the driving pawl 19 and the locking pawl 16 from their respective ratchets. This disengagement of the pawls allows the indicator dial 10, which has been spring-loaded by its advance from its initial position, to return to its initial position automatically without any attention or manipulation by the camera operator. The indiactor then is automatically ready for a new cycle of operation.

The invention has been described in detail with particular reference be preferred embodiments thereof, but it will be understood that variations and modifications can be effected within the spirit and scope of the invention as described hereinabove and as defined in the appended claims.

I claim:
1. In a photographic camera having drive means for advancing a strip of photographic film and a film footage indicating means including an indicator member advanceable from an initial position throughout a series of advanced indicating positions, means for advancing and resetting said indicator comprising: ratchet means movable with said indicator member and continually biased toward an initial position by spring means; a reciprocatable, pivoted, driving pawl selectively engaging said ratchet means for advancing same in step-by-step movement, a resilient locking pawl positioned adjacent said ratchet means and biased to normally hold said ratchet means in any of said advanced positions; a camera cover for a camera housing opening movable between a closed position and an open position; a movable resetting means comprising an integral pivoted lever movable from a first position to a second position, cooperating means on said cover engaging said pivoted lever when said cover is closed to move said pivoted lever to its first position, a second spring means operatively associated with said pivoted lever to move same to its second position when said cover is open, said pivoted lever having means thereon contacting said driving pawl and said locking pawl urging them away from said ratchet means when said pivoted lever is in said second position thus permitting said spring means to move said indicator member to said initial position.

2. The combination of claim 1 wherein said ratchet means comprises two enmeshed spur gears movable together and with said indicator member, said driving pawl engaging a first one of said gears for advancing said indicator member and said locking pawl engaging a second one of said gears for preventing return movement of said indicator member from an advanced position to said initial position.

3. The combination of claim 2 wherein said indicator member has a final indicating position, and at the point of engagement of said locking pawl with said second gear when said indicator member is in said final indicating position, said second gear has a peripheral irregularity in the form of a missing tooth so that said indicator member cannot be held by said locking pawl in any advanced position beyond said final indicating position.

4. The combination of claim 1 wherein said indicator member has a final indicating position and said ratchet means is provided with an irregularity in the form of a missing tooth cooperable with said locking pawl so that said indicator member cannot be held in any advanced position beyond said final indicating position.

5. The combination of claim 1 wherein said camera has a film take-up drive shaft and said driving pawl is operatively actuated by means of a driving engagement with said take-up drive shaft.

6. The combination of claim 5 wherein said camera has a motor and a drive train for driving said take-up drive shaft, and a clutch is interposed in said drive train between said camera motor and said take-up drive shaft.

References Cited by the Examiner
UNITED STATES PATENTS

| | | | |
|---|---|---|---|
| 2,224,383 | 12/40 | Githens et al. | 352—172 |
| 2,238,482 | 4/41 | Wittel | 352—172 |
| 2,621,866 | 12/52 | Harvey | 95—31 |
| 2,985,083 | 5/61 | Miyasaka | 95—31 |
| 3,011,419 | 12/61 | Takahama | 352—74 |

NORTON ANSHER, *Primary Examiner.*

EMIL G. ANDERSON, *Examiner.*